Aug. 9, 1955 L. CASPER 2,714,901
ELECTRICAL CONTROL SYSTEM AND APPARATUS
Filed Aug. 12, 1949 11 Sheets-Sheet 1
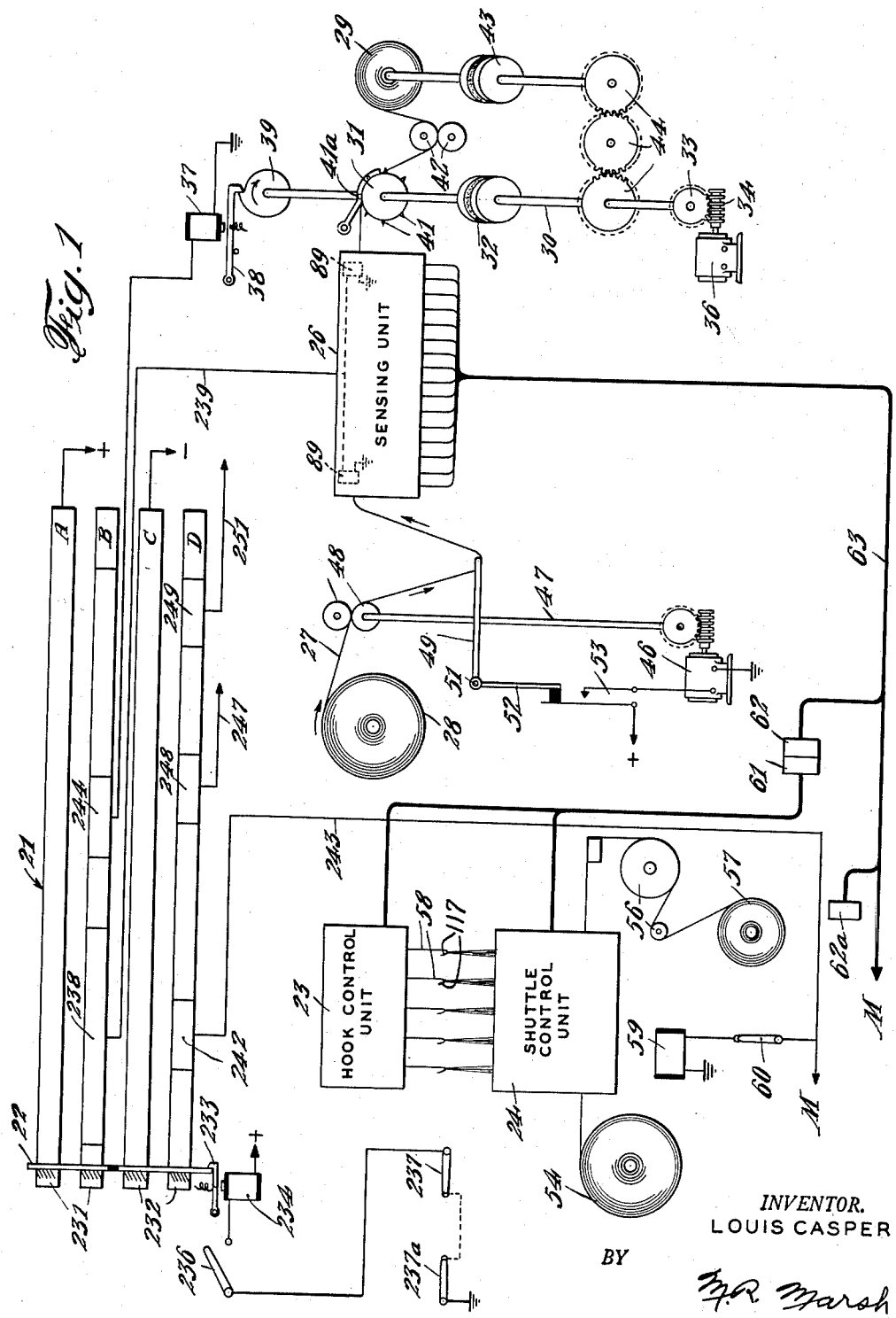
INVENTOR.
LOUIS CASPER
BY
*M. R. Marsh*
ATTORNEY

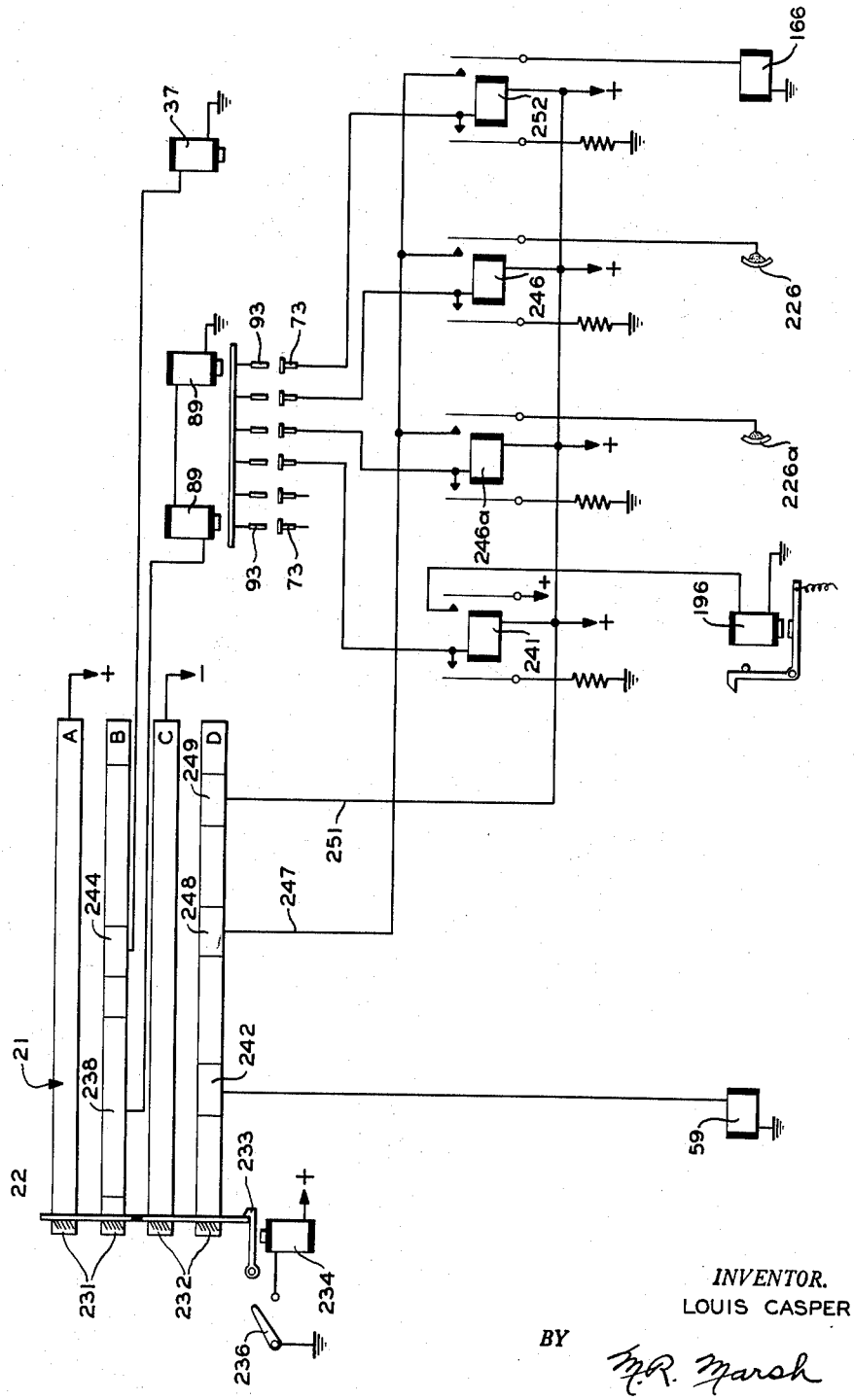

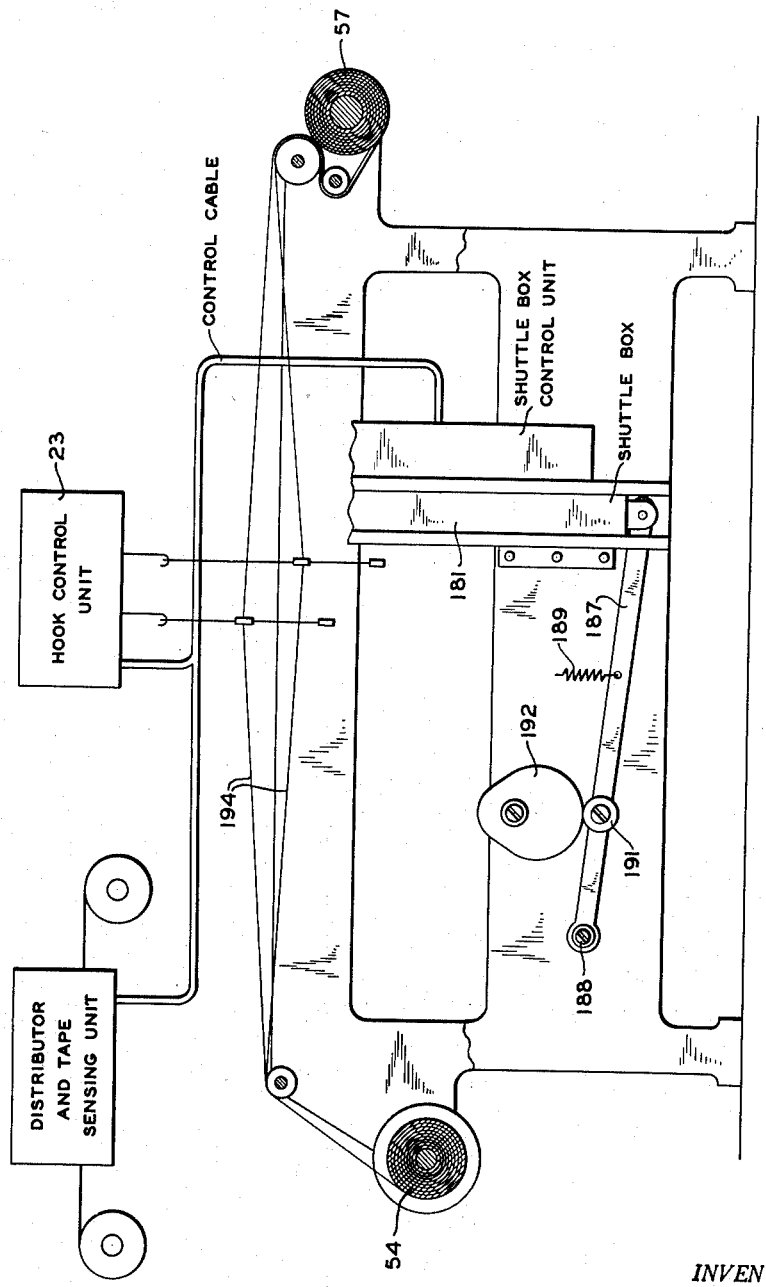

Aug. 9, 1955 L. CASPER 2,714,901
ELECTRICAL CONTROL SYSTEM AND APPARATUS
Filed Aug. 12, 1949 11 Sheets-Sheet 4

INVENTOR.
LOUIS CASPER
BY
*T. R. Marsh*
ATTORNEY

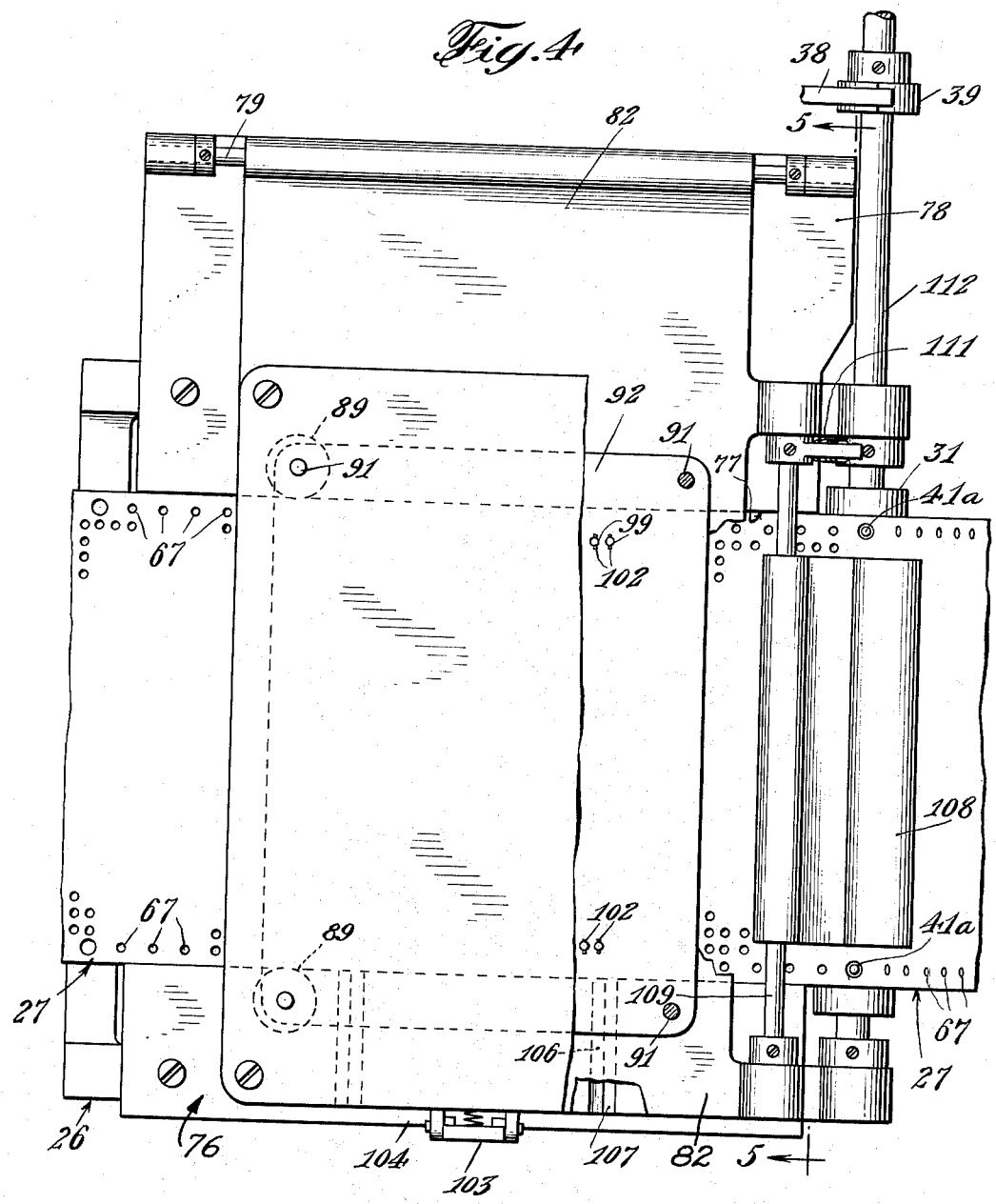

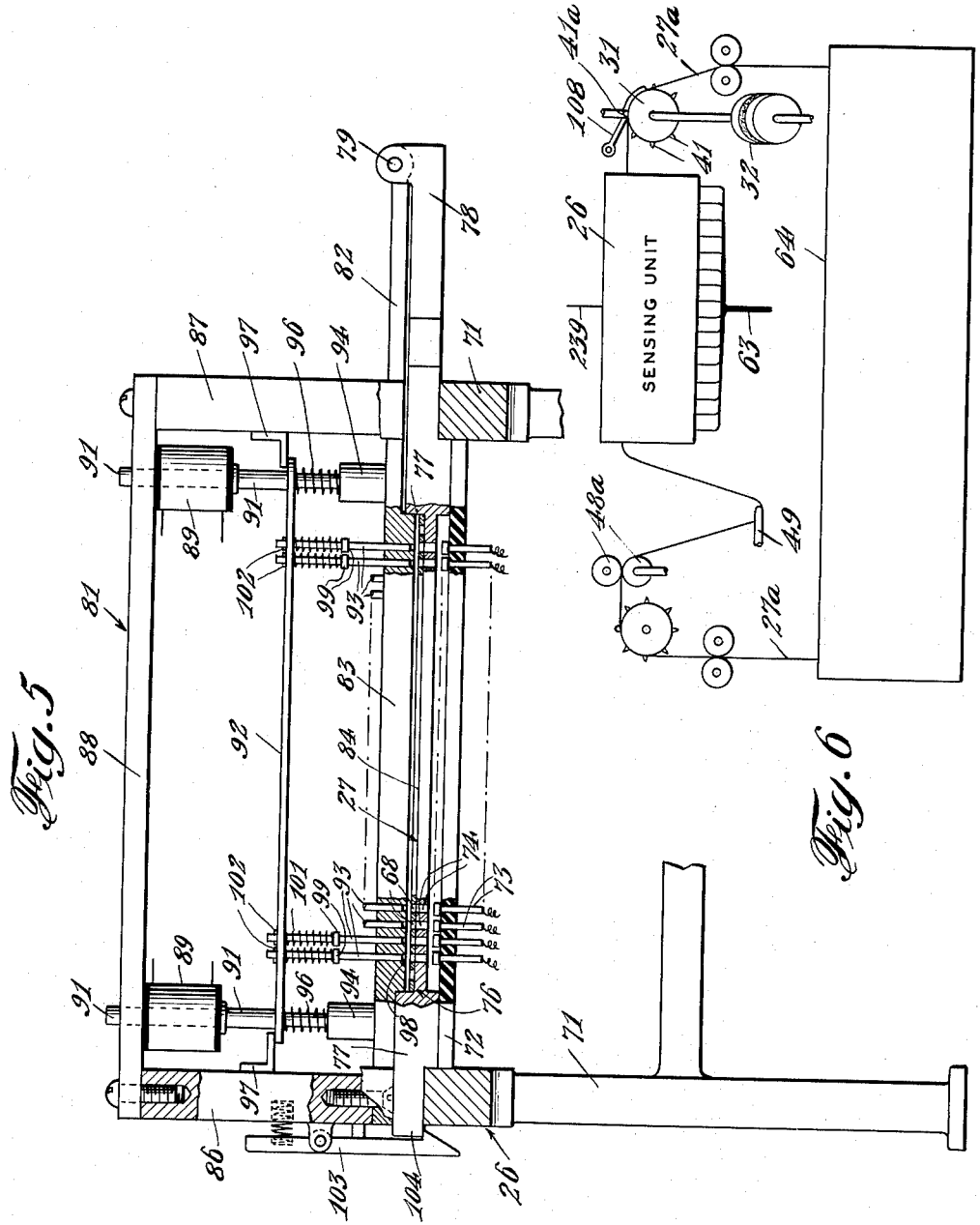

Aug. 9, 1955          L. CASPER          2,714,901
ELECTRICAL CONTROL SYSTEM AND APPARATUS
Filed Aug. 12, 1949          11 Sheets–Sheet 7
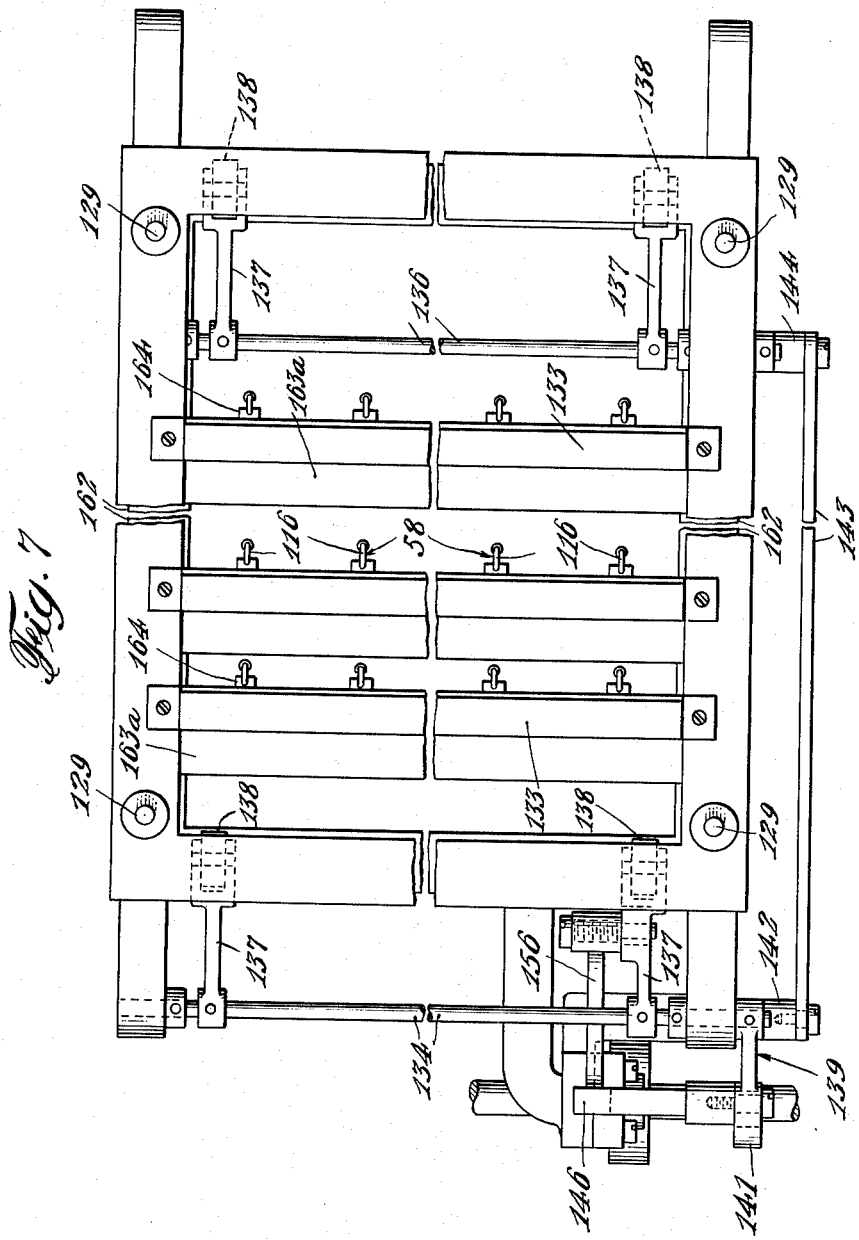
*INVENTOR.*
LOUIS CASPER
BY
*F. R. Marsh*
ATTORNEY

Fig. 8

Aug. 9, 1955 L. CASPER 2,714,901
ELECTRICAL CONTROL SYSTEM AND APPARATUS
Filed Aug. 12, 1949 11 Sheets-Sheet 9
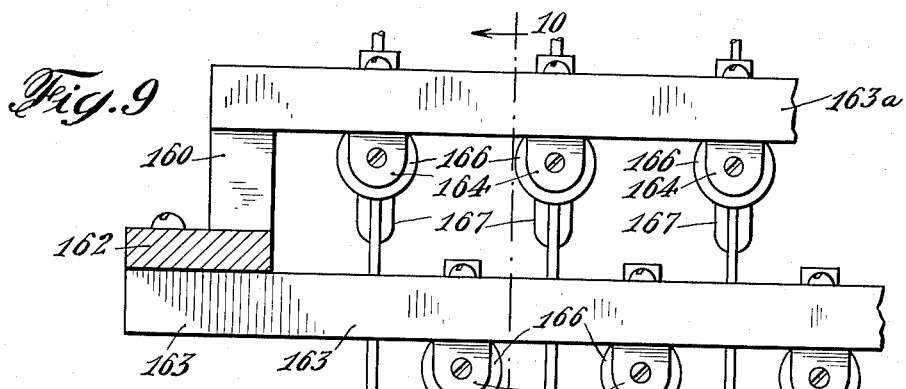
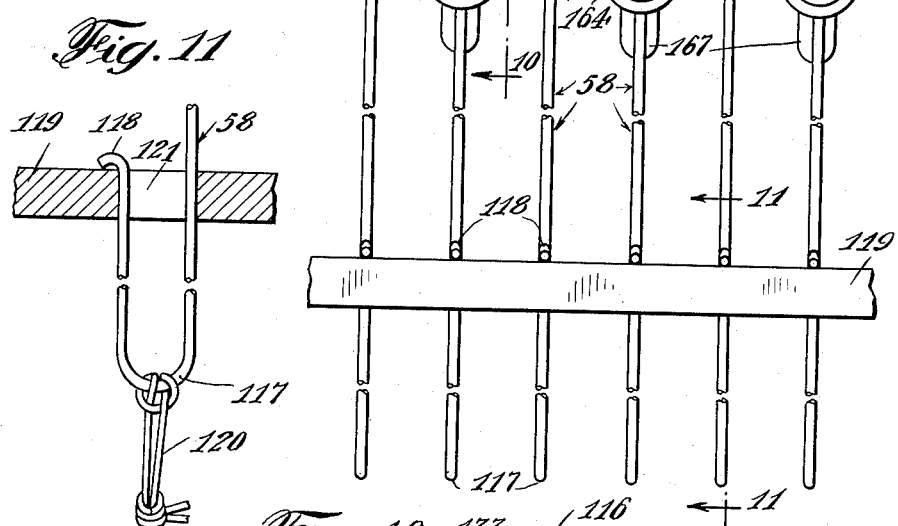
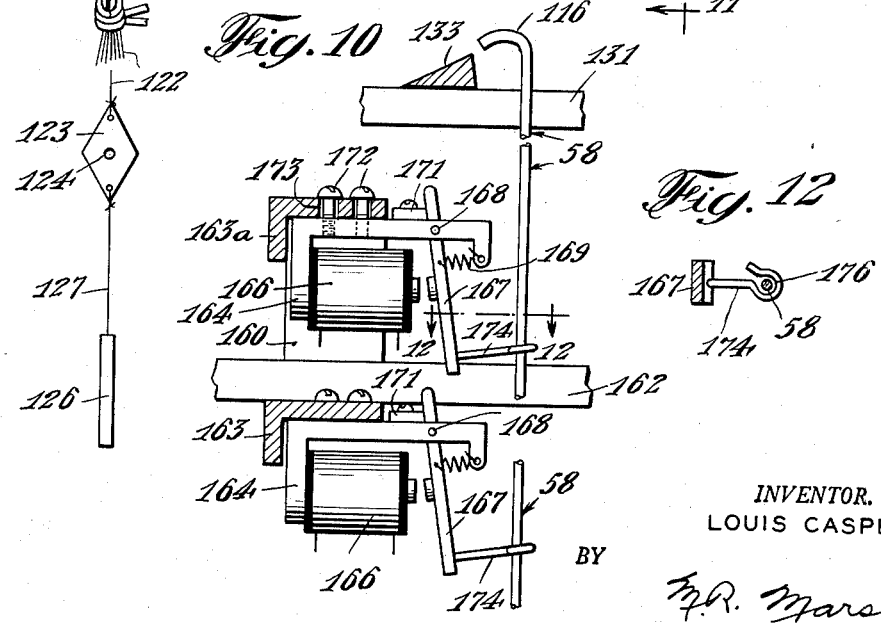
INVENTOR.
LOUIS CASPER
BY
M. R. Marsh
ATTORNEY

Aug. 9, 1955
L. CASPER
2,714,901
ELECTRICAL CONTROL SYSTEM AND APPARATUS
Filed Aug. 12, 1949
11 Sheets-Sheet 10
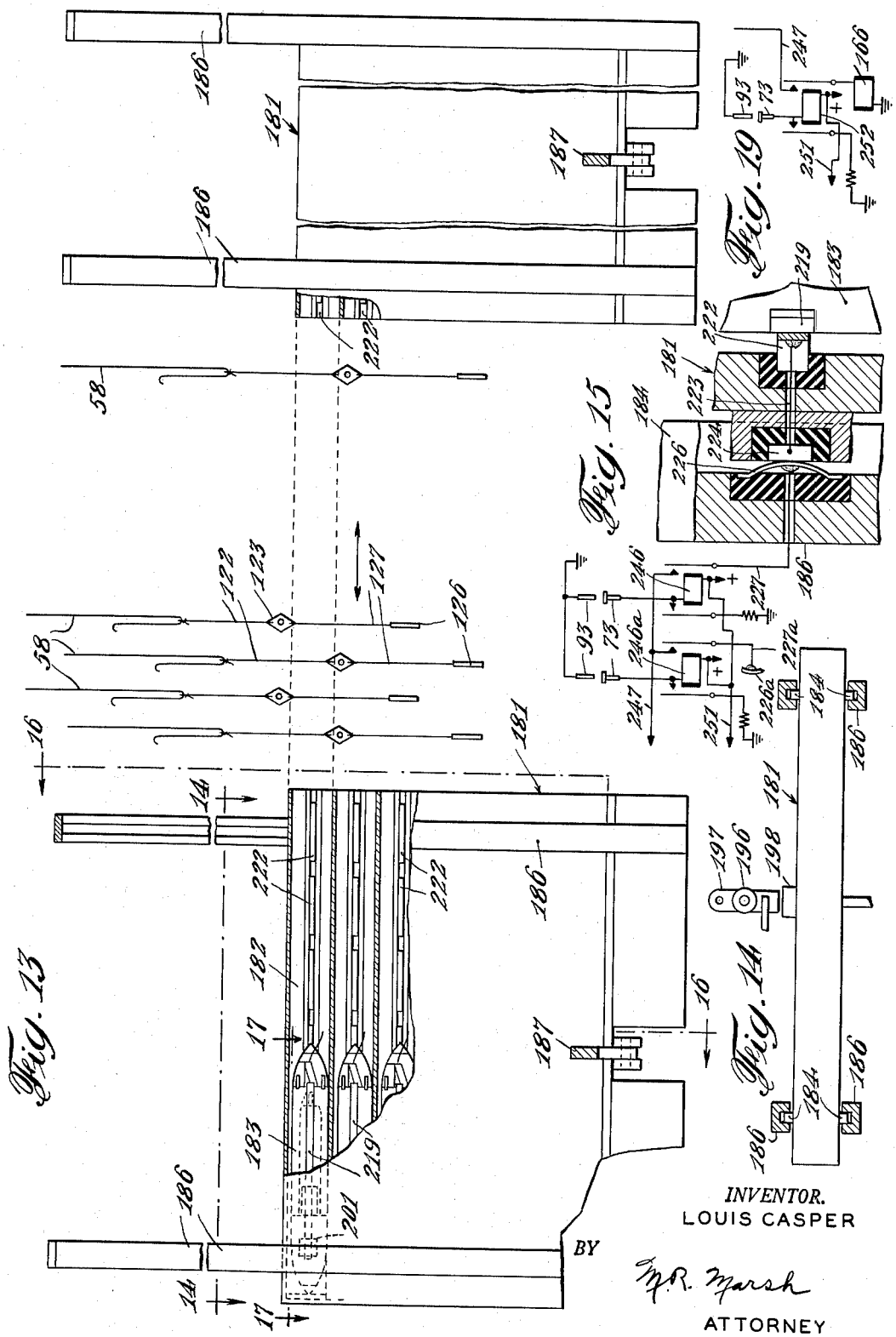
INVENTOR.
LOUIS CASPER
BY
*M. R. Marsh*
ATTORNEY

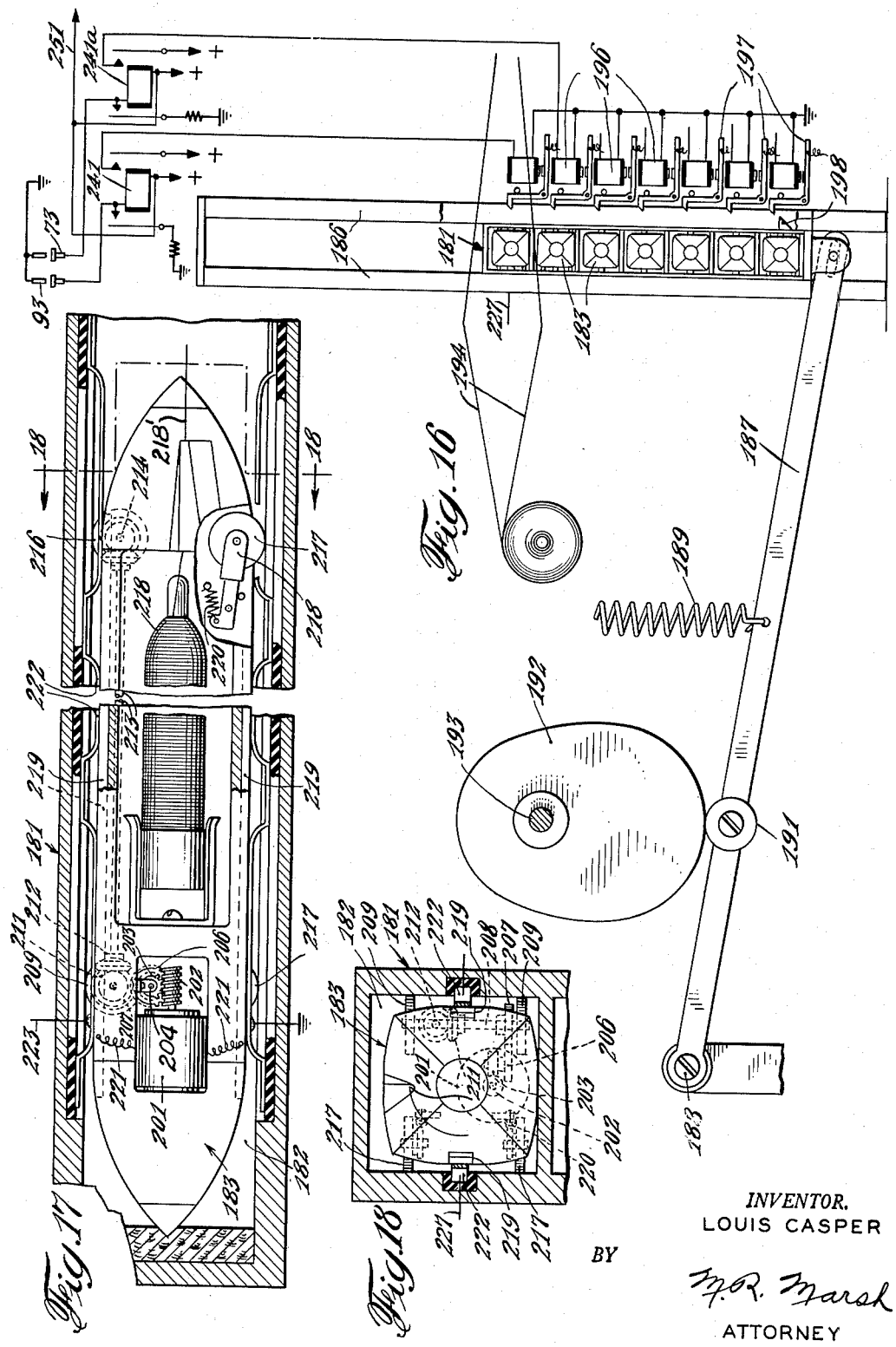

United States Patent Office 2,714,901
Patented Aug. 9, 1955

2,714,901

ELECTRICAL CONTROL SYSTEM AND APPARATUS

Louis Casper, Richmond Hill, N. Y., assignor to Electrotex Corp., New York, N. Y.

Application August 12, 1949, Serial No. 109,866

10 Claims. (Cl. 139—1)

This invention relates primarily to electrical control systems and apparatus therefor. More particularly the invention relates to a control system and apparatus for selectively and automatically controlling variable and selectively operable machines and mechanisms together with the sequence of operations of the various components thereof, or a series or battery of separate machines each arranged to selectively perform a different operation or series of operations on a work unit or piece sequentially associated therewith.

The invention is hereinafter described and shown in the drawings as being applied to and employed in conjunction with the control of a textile weaving machine of the Jacquard type. It will be obvious, however, as pointed out above, that the principles of the invention are readily applicable to the control of various other types of machines or a series of machines.

In accordance with the above, one of the principal objects of the present invention is to provide a system and apparatus for automatically and electrically controlling one or more of a series of machines for performing a sequence of selectively varied operations.

Heretofore looms arranged for jacquard control weaving have mechanically associated therewith individual control apparatus, one set of control apparatus being required for each loom. Such control apparatus includes a series of perforated pattern cards, each one of which mechanically controls the loom through a single cycle of operation wherein certain of the warp threads are elevated in conjunction with the passage of the shuttle through the shed formed by the elevated warp threads. In this type of machine, since the control of the loom is entirely mechanical, the control apparatus has to be adjacent the weaving loom and can control but one loom at a time. In this respect it is a further object of the invention to provide a control apparatus for a Jacquard type loom which is readily adapted for the control of a plurality of looms simultaneously so that but a single control apparatus is required for a number of looms. In this connection a further feature of the invention permits the control apparatus to be remote from the weaving loom since the only connection between the control apparatus and the loom or looms it controls is through the medium of electrical conductors. Thus the control apparatus can be located in a dust-free room and adapted to control one or more of the weaving looms remote therefrom.

In the preferred embodiment of the invention herein disclosed, the control form is in the nature of a tape perforated in accordance with a predetermined plan to represent the design to be woven by the Jacquard loom, with each transverse section of the tape representing a cycle of operation of the looms. Each transverse section of the tape is mechanically sensed in the preferred embodiment by sensing fingers which establish electrical circuits, although photoelectric sensing means could be employed, and the absence or presence of a perforation determines the manner in which the loom is controlled. Some of the code or elemental areas control the lifting of the warp threads while others of the perforations determine which ones of a plurality of shuttles are operated in the accompanying cycle of operation.

In this respect another feature of the invention resides in the automatic selection of any one of a plurality of shuttles for operation during a cycle of operation of the loom controlled by the control mechanism.

Another object of the invention is to provide a motor operated shuttle whereby movement of the shuttle is obtained through the action of an electric motor contained therein.

Still another object of the invention resides in the provision of novel means for activating or producing movement of any selected one of a plurality of shuttles.

The above and further objects of the invention will be more apparent in the following detailed description of the preferred embodiment of the invention wherein reference is made to the accompanying drawings, in the latter of which:

Fig. 1 is a diagrammatic view showing some of the mechanisms of the invention in block form and the manner in which these mechanisms and various others cooperate with one another;

Fig. 1a is a circuit drawing of the distributor and electrical elements controlled thereby;

Fig. 1b is a drawing of certain parts of a conventional loom, and illustrating the manner in which elements of applicant's invention may be associated therewith;

Fig. 4 is a plan view of the sensing unit of Fig. 3;

Fig. 5 is a vertical sectional view of the sensing unit taken substantially on line 5—5 of Fig. 4;

Fig. 6 is a view showing a modified arrangement of the control form wherein it is in a continuous loop;

Fig. 7 is a plan view of the so-called hook control unit which operates to selectively raise desired ones of the hooks;

Fig. 8 is a front elevational view of the hook control unit of Fig. 7;

Fig. 9 is a vertical sectional view of a section of the hook control unit;

Fig. 10 is a sectional view of the selector mechanism of the hook control unit taken substantially on line 10—10 of Fig. 9;

Fig. 11 is a sectional view taken substantially on line 11—11 of Fig. 9, and in addition illustrates the manner in which the warp thread eye is associated with the lower end of a hook;

Fig. 12 is a fragmentary detail sectional view taken on line 12—12 of Fig. 10;

Fig. 13 is an elevational view partly in section showing the shuttle boxes, one of which is located on each side of the loom;

Fig. 14 is a plan view of one of the shuttle boxes showing the guiding arrangements therefor, taken substantially on line 14—14 of Fig. 13;

Fig. 15 is a detail view showing the manner in which an electrical circuit is established to a shuttle in the shuttle box;

Fig. 16 is a vertical sectional view taken substantially on line 16—16 of Fig. 13, and illustrates the operating mechanism for a shuttle box;

Fig. 17 is a sectional view taken substantially on line 17—17 of Fig. 13, and illustrates the manner in which a shuttle is contained within one of the compartments of the shuttle box;

Fig. 18 is a sectional view taken substantially on line 18—18 of Fig. 17; and

Fig. 19 is a modified circuit drawing.

General description

Figure 2:
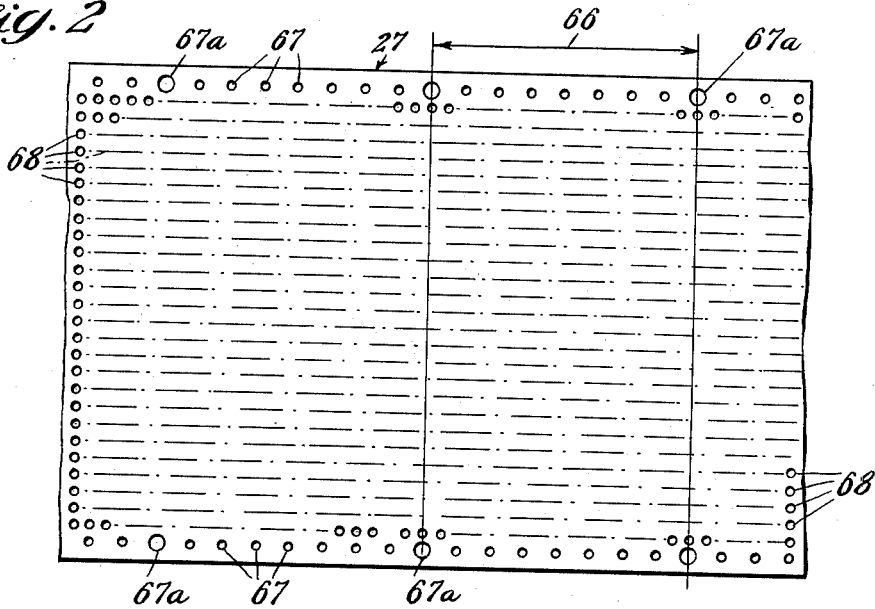
Fig. 2 is a face view of a section of the control form of tape employed to selectively control the Jacquard loom.

The general operation of the invention will first be described with reference to Fig. 1 which diagrammatically shows some of the components thereof and their relation with respect to one another.

For controlling and timing some of the operations of the mechanisms included in the present invention, a distributor indicated generally by reference numeral 21 is employed. In the preferred embodiment the distributor comprises a plurality of concentric rings and a co-operating brush arm 22 which sweeps over the rings to establish electrical circuits in the desired time relationship. The operation of the distributor will be described more fully hereinafter.

In accordance with the principles of the invention a control form in the nature of a perforated tape is employed. This tape passes through a sensing unit wherein successive transverse sections thereof are sensed. Depending upon the absence or the presence of a perforation in elementary areas of the tape, electric circuits are controlled to cause selective functions to be performed or not performed. The selective functions performed include the raising of selected ones of the warp ends or threads through the operation of a hook control unit indicated generally by reference numeral 23 and the selection of a shuttle for operation in conjunction with a cycle of operation of the hook control unit. In the arrangement of the invention described, a plurality of shuttles are employed, each of which may contain a bobbin having a different colored thread. The shuttles are arranged in a shuttle box or control unit 24, and as hereinafter set forth, any one of the shuttles may be selected for operation at a time.

The sensing unit, indicated generally by reference numeral 26, includes a plurality of sensing pins with co-operating contacting elements. There is a sensing pin for each elemental or code position of a pattern area or transverse section of the tape. When sensing an area wherein a perforation occurs, an electrical circuit is established which subsequently and selectively controls the performance of the associated functions such as raising the representative hook or activating the respective shuttle.

The sensing unit 26 is controlled by the tape 27 which may be supplied from a supply roll 28 and taken up on a takeup reel 29 after being sensed. The advancement of the tape 27 through the sensing unit is intermittent and this advancement is accomplished by a feed wheel 31 adapted to make one revolution at a time in conjunction with each cycle of operation of the sensing unit 26 and the distributor 21. The feed wheel 31 is driven through a friction clutch 32 of suitable design and gears 33 and 34 from an electric motor 36. During a sensing operation the tape 27 is stationary and after a pattern area of the tape has been sensed and the representative control circuits established, the tape is advanced to bring the next pattern area or transverse section into operative relation with the sensing pins. The tape advancement is accomplished by the momentary operation and energization of a trip magnet 37 which raises the trip latch 38 to permit the stop disc 39 and feed wheel 31 to rotate with the motor driven shaft 30. The feed wheel 31 has a series of feed pins 41 extending from the periphery thereof which engage feed holes along the edges of the tape, and as the feed wheel rotates the tape 27 is advanced. Since the trip magnet 37 is only momentarily operated, the trip arm 38 will be released before the stop disc 39 makes a complete revolution and therefore stop the disc after one complete revolution. As the tape 27 leaves the feed wheel 31, it passes between guide rollers 42 and then to the takeup reel 29. The latter is frictionally driven through a friction clutch 43 and gears 44 from the constantly rotating shaft 30. The friction clutch 43 rotates the takeup reel 29 only as much as it required to wind up the tape 27.

In order that the tape 27 feed properly through the sensing unit 26, an auxiliary feeding unit is employed. This unit assures that there is always a loop of tape ahead of the sensing unit 26 and the intermittent and rapid rotation of the feed wheel 31 need only advance the tape from the loop. The auxiliary tape feed unit includes a motor 46 which rotates a shaft 47 having feed rollers 48 thereon between which the tape 27 passes. When the motor 46 is operating, the feed rollers 48 pull the tape 27 from the supply roll 28 whereby a loop in the tape is formed between the feed rollers 48 and the sensing unit 26. Engaging the loop is a tape lever arm 49 pivoted at 51 with a depending arm 52 operatively associated with a pair of contacts 53. As the tape 27 is advanced by the feed wheel 31, the tape loop decreases in size and causes the tape lever 49 to pivot in a counterclockwise direction whereby the contacts 53 are permitted to close. The contacts 53 are in the circuit to the motor 46 and closure thereof starts the motor and rotates the feed wheels 48 to pull the tape 27 from the supply roll 28. Thus a supply of tape is maintained ahead of the sensing unit 26 and the feed wheel 31 can advance the tape with a minimum of pull and without ripping or tearing the feed holes.

The loom to which the mechanism of the present invention may be applied may be of the type well known in the art and for the most part similar to the Jacquard type looms now employed. Since this type of loom is well known in the art only some of the essential elements thereof are shown in the drawings and consist of a warp supply reel 54 about which the warp threads are wound, intermediate guide and feed rollers 56, and a takeup reel 57 about which the woven fabric is wound. The hook control unit 23 includes a plurality of hooks such as 58 which are selectively elevated to raise associated warp threads. In the preferred embodment of the invention the hook control unit 23 operates in such a manner that as the selected ones of the hooks 58 are raised, the unselected ones are lowered. This feature enables a shed of sufficient height to be formed by the warp threads for the passage of a shuttle therethrough with a minimum of movement of the hooks and, other things being equal, permits higher speed operation of the loom and control units. In conjunction with the forming of each shed in the warp threads, a shuttle is activated and passes through the shed to a shuttle box on the opposite side.

As will be noted from the diagrammatic showing in Fig. 1, the hook control unit 23, the shuttle box 24 and various other electrical responsive elements, such as a clutch control mechanism 59 of the loom, are all electrically controlled. Accordingly there is no mechanical association whatsoever between the sensing unit 26 and the controlling distributor 21 and the control elements of the loom. Hence the sensing unit and distributor can be located remotely from the loom.

The invention also contemplates and has as one of the features thereof the arrangement whereby a single sensing unit such as 26 may control remotely a plurality of looms through their respective control units such as hook control units 23 and shuttle control units 24. For this purpose it is contemplated that the control units of a loom be wired to one or more multiple conductor plugs such as 61 which may be inserted in co-operating jacks 62 to complete electrical circuits over conductors of a cable 63 from the sensing unit 26. The conductors of cable 63 may be multipled to a series of other jacks such as 62a into which the plugs such as 61 of other loom control units may be inserted whereby the control unit will control these looms. Thus a single sensing unit 26 with its single control tape 27 may be employed to simultaneously control a plurality of looms.

Instead of the arrangement of Fig. 1 wherein the tape is supplied from a supply roll 28 and taken up on a takeup reel 29, it may be formed into a continuous loop as illustrated in Fig. 6. Here the tape 27a after leaving the feed wheel 31 is directed into a storage compartment 64. The tape 27a accumulates in the compartment 64 and is withdrawn therefrom as needed by the feed wheels 48a. The feed wheels 48a maintain the tape loop ahead of the sensing unit 26 from which it is intermittently advanced by the feed wheel 31.

The control tape

A section of the control tape is shown in Fig. 2 and in the preferred embodiment of the invention, the tape is of paper and of suitable strength so that it may be reused as many times as desired. The tape 27 is fed through the sensing unit 26 and the perforations in the elementary code areas determine what functions are performed by the loom. The tape 27 is arranged so that each section or so-called pattern area thereof controls the loom for one cycle of operation. For example, a length or section of the tape designated by the reference numeral 66 is construed to be one pattern area and the equivalent of a separate cord as employed in the normal jacquard control mechanism. The tape has along the edges thereof a series of feed holes 67 through which the pins 41 of the feed wheel 31, Fig. 1, extend whereby the tape is advanced when the feed wheel rotates. As will be noted in the figures, each pattern area of the tape such as 66 begins and ends with an enlarged feed hole 67a. These enlarged feed holes 67a cooperate with enlarged pins such as 41a, Figs. 1, 3 and 4, on the feed wheel 31 for indexing the tape in the sensing unit and insures that each code area of the tape is positioned over its associated sensing pin when a sensing operation occurs. In order that the tape 27 be properly indexed in the sensing unit, the feed wheel 31 is arranged for rotative adjustment with respect to the stop disc 39.

In the embodiment of the invention shown, each pattern area of the tape has a total of 416 elemental areas, there being 16 transverse rows each having 26 elemental areas. The major portion of these elementary areas control the selection of hooks in the hook control unit 23 while a smaller number, for example, 14 in the embodiment shown, may be employed to select the proper shuttles. A greater or lesser number of elemental area may be employed in each pattern area of the tape depending upon the intricacy of design to be woven and various other factors, such as the number of warp threads. The holes 68 in the tape 27 represent a perforated elemental area.

The sensing unit

Figure 3:
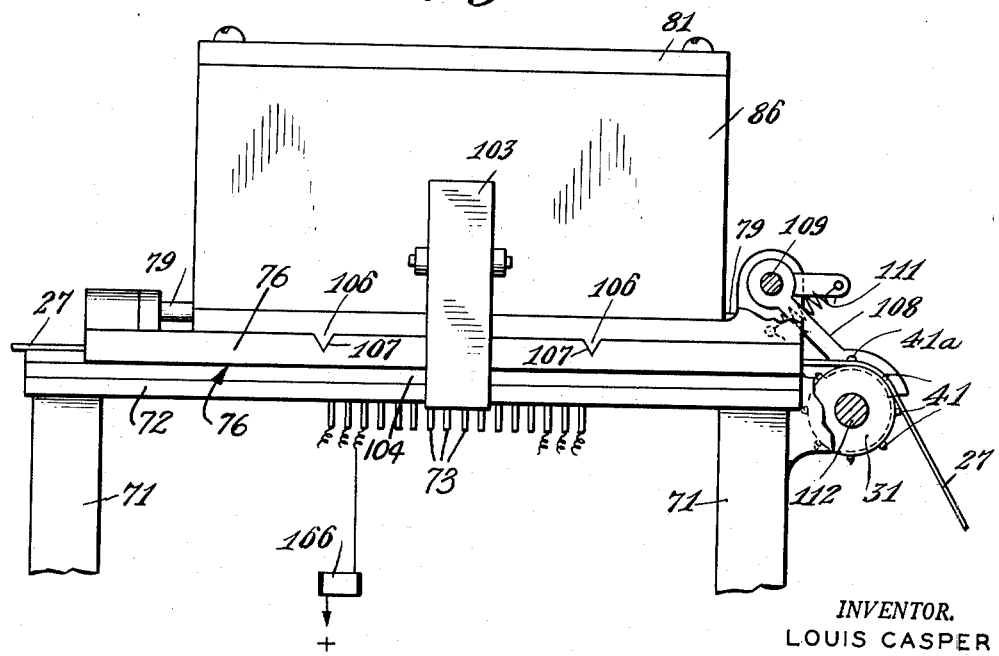
Fig. 3 is a front elevational view of the so-called sensing unit which senses perforations in the tape and establishes corresponding electrical circuits.

The sensing unit shown in Figs. 3, 4 and 5 has a frame structure 71 of suitable rigidity which supports a horizontal plate 72 of insulating material. This plate is somewhat larger than a pattern area of the control tape 27, and mounted in the plate are a series of contacting elements 73 insulatively separated from one another. The contacting elements 73 are arranged in line with respective holes such as 74 in another plate 76, Fig. 5, spaced a slight distance above. The plate 76 has the upper surface thereof grooved from one side to the other so that the higher sections 77 at its front and back edges form a trough substantially equal in width to the width of the tape 27.

The plate 76 has a rearwardly extending section 78 on the end of which is carried a pivot pin 79. Pivoted on the pin 79 is a so-called top unit indicated generally by reference numeral 81 of the sensing unit. This top unit includes a lower plate 82 having a depending section 83 adapted to enter the recessed section in the plate 76 formed by the upwardly extending projection 77. The projection 83 does not extend to the bottom of the trough in the plate 76 so that with the top unit in the position shown in Fig. 5 there is a slot 84 between the plates 76 and 82 to permit free passage of the tape 27 therethrough.

Extending upwardly from the front edge of the plate 82 is a block 86 which together with another block 87 adjacent the rear edge of the plate 82 support a top plate 88. Secured to the underside of the top plate 88 by suitable means are a series of solenoids 89 and in the preferred embodiment of the invention there are four of these solenoids, each having plungers such as 91. The plungers 91 have secured thereto a finger carrying plate 92 which in a manner hereinafter described carry a series of fingers 93 for sensing the code perforations in the tape 27. The lower ends of the plunger rods 91 of the solenoids are somewhat smaller in diameter and are guided in holes in posts 94 extending upwardly from the upper surface of the plate 82. Expansion springs 96 surrounding the lower end of the plungers 91 tend to elevate the finger carrying plate 92 to hold the same against adjustable stops such as 97 secured to the inner surfaces of the blocks 86 and 87.

The sensing fingers 93 are guided adjacent their lower ends in holes such as 98 in the central section of the plate 82 and at their upper ends in associated holes in the finger carrying plate 92. Each finger 93 has adjacent the center thereof an enlarged section 99 against the upper surface of which the lower end of an associated spring 101, coiled about the finger, presses. The springs 101 exert a slight pressure and tend to lower the fingers 93 and in the normal unoperated position of the sensing unit, the springs hold cross pins 102 in the upper ends of the pins against the upper surface of the finger carrying plate 92. The holes 74 and 98 are in alignment with each other, with the holes 74 being somewhat larger than the lower end of the sensing fingers to permit free passage therethrough; the holes 74 are in turn somewhat smaller than the code perforations such as 68 in the control tape.

Following the advancement of a pattern area of the tape 27 into the sensing unit 26, the solenoids 89 are energized and since the lower sections of the plungers 91 are of non-magnetic material, this causes the finger carrying plate 92 to move in a downward direction against the action of the springs 96. During this operation of the finger carrying plate 92, the fingers 93 having perforations 68 in the tape directly in line with the lower ends thereof will pass through such perforations into the guide holes 74 of plate 76 and through these holes to make contact with the upper enlarged head of associated contacting elements 73. If during the downward movement of the finger carrying plate 92, a finger 93 has its associated elemental area unperforated, the downward movement of the finger will be stopped as the end of the finger contacts the tape. Further movement of the finger carrying plate 92 in this direction causes the compression of the spring 101 of the associated finger 93 and no contact between the lower end of the finger and its associated contacting element 73 will be made. Thus, depending upon a perforation or the absence of a perforation in the control tape 27, contact between a finger 93 and its associated contacting element 73 is established or not established. Subsequently the solenoids 89 are de-energized to permit the springs 96 to elevate the finger carrying plate 92 and draw the fingers 93 from associated perforations in the tape 27, and in conjunction therewith the feed wheel 31 is rotated to advance the next pattern area in the tape into operative relation with the fingers 93. Such operation of the sensing unit continues as long as the distributor 21, Fig. 1, operates, and in each cycle of operation of the sensing unit, the loom is operated through an associated cycle of operation in a manner pointed out in more detail hereinafter.

In order to facilitate the threading or initial placement of the tape 27 in the sensing unit, the top unit 81 can be pivoted in an upward direction about the pivot 79 and when returned to the position shown in Fig. 5, a spring operated latch 103 engages a projection 104 on the front end of the plate 77 to latch the top unit in its normal operating position. The proper alignment of the top unit 81 with the plate 76 and the fingers 93 with associated holes 74 is insured by a pair of V-blocks 106, Fig. 3, on the front lower edge of the top unit, adapted to engage associated V's 107 in the upper surface of the plate 76.

A shoe 108, Figs. 3 and 4, presses the tape 27 onto the feed wheel 31. The shoe 108 is pivoted on a rod 109 and a spring 111 urges the same toward the feed wheel. The rod 109 is supported from the top unit 81 and is movable therewith while the feed wheel 31 is mounted on a shaft 112 pivotally supported from the frame structure 71.

*The hook control unit*

The elements and mechanisms of the hook control unit are shown in Figs. 7 to 11, inclusive, and will now be described. This unit employs a series of hooks somewhat similar in construction and function to those employed in the regular Jacquard loom control mechanism. The hooks of the present embodiment are selectively elevated in accordance with the perforations in each pattern area of the tape 27 and the selectively operated hooks raise one or more of the warp threads to form the desired shed in the warp for the passage of the shuttle therethrough. The hook control unit is suitably supported above the loom it is arranged to control in the manner of the regular jacquard control unit, and the supporting means includes the structural elements indicated generally by reference numeral 113, Fig. 8. The hooks, indicated generally by reference numeral 58, may be of the usual length and have the upper ends 116 bent at an angle slightly more than 90° to the main vertical section thereof so as to form a hook portion. Each hook 58 has the lower end bent back upon itself and spaced away from the main stem portion so as to form a loop 117 to which the neck cords 120 and harness lines 122 from the warp thread eyes may be secured. The free ends 118 of the loop sections of the hooks are bent at an angle of substantially 90° and normally rest on a plate 119. The plate 119 has a series of slots 121, Fig. 11, therein, through which the lower loop ends 117 of the hooks pass, and the lower ends of the hooks are thus guided in the plate 119. The harness lines 122 tied to the lower ends of neck cords 120 have attached at their lower ends eyes 123 with central holes 124, Fig. 11, for the passage of the warp threads therethrough. A weight 126 secured by a cord 127 to the lower part of the eye 123 urges the eye and the attached hook 58 in a downward direction and maintains the section 118 normally in engagement with the upper surface of the plate 119. As in the normal arrangement of a Jacquard control loom, each hook such as 58 may have associated therewith through individual harness lines 122 a plurality of eyes such as 123 whereby a single hook can control a plurality of warp threads.

The upper section 128 of the hook control unit framework 113 has extending from the upper side thereof a series of guide posts 129. The guide posts 129 extend through suitable clearance holes in a so-called grid frame 131 of substantially rectangular construction having end elements and side elements. Springs 132 on the guide posts urge the grid frame in a downward direction onto the frame section 128. Extending transversely from one side element to the other of the grid frame 131 are a series of triangularly shaped grid bars 133. The grid bars 133 are secured to the grid frame and in the manner pointed out hereinafter move up and down with the grid frame to operate selected ones of the hooks 58 whereby certain of the warp threads are elevated.

Pivotally supported in the section 128 of the frame structure are a pair of shafts 134 and 136. As most clearly shown in Fig. 7, these shafts have secured thereto for pivotal movement therewith a pair of arms 137. The arms 137 carry in the free ends thereof rollers 138 engaging the underside of the transverse elements of the grid frame 131. The shaft 134 also has secured thereto a bell crank 139 having a horizontal arm 141 and a vertical depending arm 142. The depending arm 142 has pivotally attached to the free end thereof one end of a link 143, the other end of which is pivotally attached to the lower end of a depending arm 144 secured at its upper end for pivoting movement therewith to the shaft 136. Through the above described elements on the shafts 134 and 136 it can be seen that as the bell crank 139 rocks in a counterclockwise direction as viewed in Fig. 8, the grid frame 131 will be elevated. This action of the grid frame is against force of the springs 132 and as it moves upward, the grid bars 133 move therewith. Subsequent pivoting of the bell crank 139 in a clockwise direction permits the grid frame 131 to return to its normal position.

The bell crank 139 is operated through a link 146 which in turn is operated from the loom operating mechanism, and the operating element therefor may be an eccentric or some cam operated lever in the loom, the operation of the link 146 being in timed relation to the various other elements.

Figure 8:
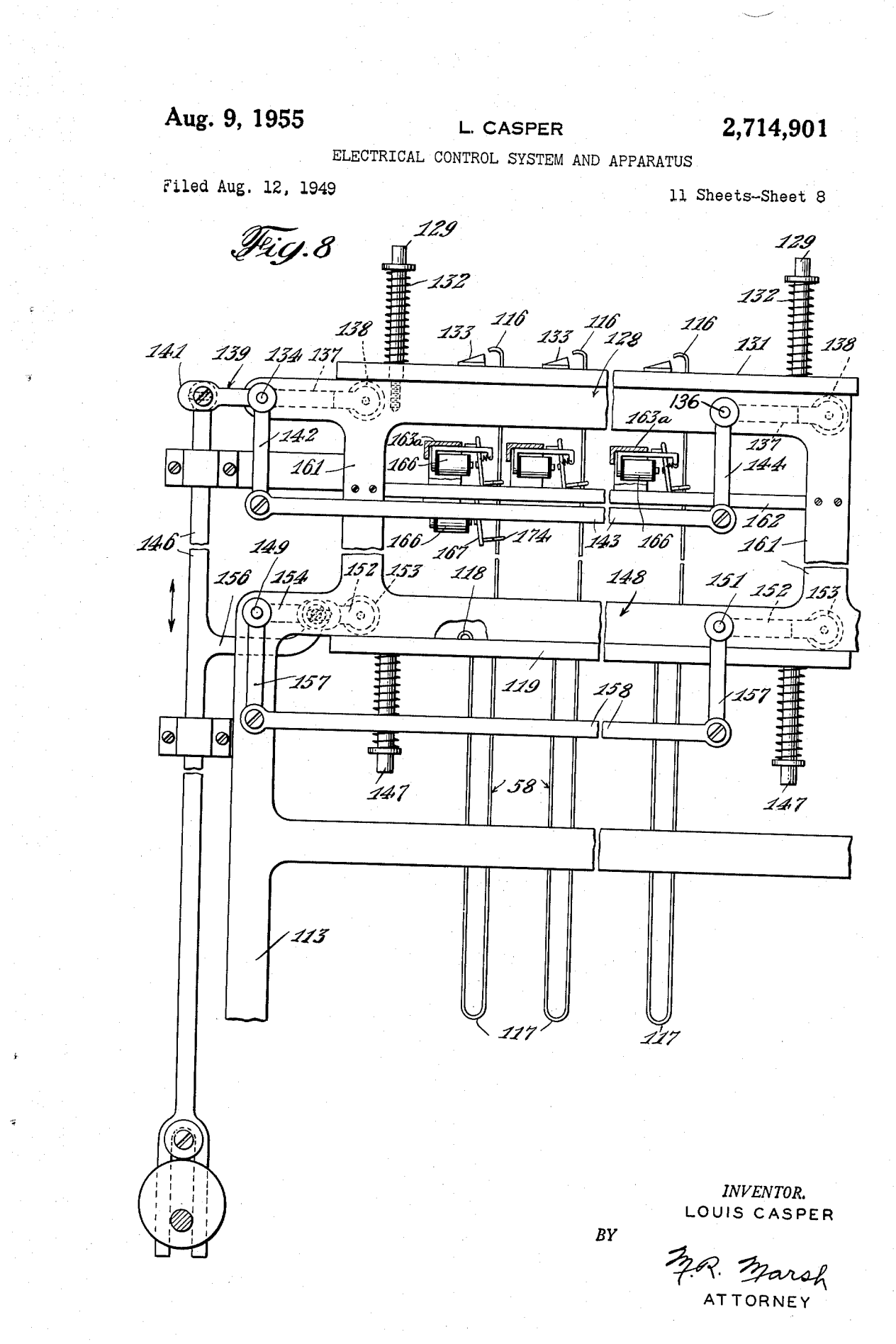

The hereinbefore mentioned plate 119 which guides the hooks 58 adjacent their lower ends and also serves as an anchor for the hooks, is of rectangular construction and has adjacent the four corners thereof clearance holes for guide pins 147. The guide pins 147 extend downwardly from the frame section 148 and have springs thereon engaging the underside of the plate 119 which urge the same in an upward direction against the underside of the section 148. The section 148 has a pair of horizontal shafts 149 and 151 which have secured thereto arms 152. The arms 152 are similar to the arms 137 and carry in the free ends thereof rollers 153 engageable with the upper surface of the plate 119. The shaft 149 has extending from the right hand side thereof, as shown in Fig. 8, an arm 154 which has pivotally connected to the free end thereof the end of an arm 156 extending rightwardly from the link 146. The shafts 149 and 151 are connected by means of arms 157 and a link 158 for simultaneous movement, and as the link 146 moves in a downward direction the shafts 149 and 151 pivot in a clockwise direction. During this movement the rollers 153 engaging the top of the plate 119 cause the same to move in a downward direction against the action of the springs on the guide pins 147. Subsequent upward movement of the link 146 permits these springs to return the guide plate 119 to its normal position such as that shown in Fig. 8.

Thus through the described mechanism the plate 119 moves in a downward direction as the grid frame 131 moves in an upward direction. Accordingly, in a manner more fully pointed out hereinafter, the unselected hooks 58 are lowered a distance substantially equal to the distance the selected ones of the hooks are raised. In this manner the selected ones of the hooks are required to move only approximately one-half the distance they would otherwise have to move to form a shed of sufficient height to permit the passage of the shuttle therethrough.

*Hook selection*

Supported from the vertical sections such as 161 of the structural framework of the hook control unit are a pair of bars 162, one on each side of the frame unit. The bars 162 are preferably located as close to the grid frame 131 as practical and have secured to the underside thereof a series of transversely extending angle iron bars 163. A similar set of angle iron bars 163a are supported on blocks 160 on the top of the bars 162. The arrangement of these angle iron bars 163 and 163a can be more readily seen in Figs. 9 and 10.

Secured to the underside of the angle bars 163 are a series of substantially L-shaped magnet yokes 164 which have secured thereto individual selecting magnets 166. The cores of the selecting magnets 166 are horizontally positioned and have in operative relation with the right hand ends thereof, as shown in Fig. 10, individual armatures 167 pivoted on pins 168 and normally held in retracted position by attached springs 169. Stops 171 adjustably secured to the upper surface of the yokes 164 determine the retracted position of the armatures. The screws 172 by which the yokes are mounted to the angle iron bars 163 extend through clearance holes 173 whereby the complete selector magnet is adjustable within certain limits with respect to its mounting angle iron bar 163. The lower end of each selector magnet armature 167 has extending rightwardly therefrom, as shown in Figs. 10 and 12, a rod 174 of spring material which has the outer end thereof bent back upon itself to form an eye 176 through which passes the stem portion of its associated hook 58. The hooks 58 are somewhat flexible and when it is desired to replace the hook, the eye 176 may be sprung open to permit removal of the hook therefrom.

As most clearly shown in Fig. 10, the upper hook portion 116 of a hook 58 is normally slightly to the right of its operating grid bar 133 and the hook portion is slightly above the highest point on its associated grid bar. Accordingly with a selector magnet 166 deenergized, the grid bar 133 can be elevated without operating a normally positioned hook 58. However, the energization of the selector magnet 166 moves the associated hook portion 116 of its hook over the grid bar 133 so that subsequent elevation of the grid bar causes the hook to be elevated therewith. This selecting of a hook for operation may be accomplished by flexing and/or pivoting the hook about its lower end, and since the upper ends of the hooks practically float, the load on the selector magnet when selectively positioning a hook is very small. Consequently the selector magnets 166 can operate extremely fast.

Preferably the selector magnets 166 have small dimensions so that a large number can be accommodated in the space provided by one set of bars 163 and 163a. However, should a greater number of selector magnets be desired than can conveniently be mounted from one set of bars such as 163 and 163a, one or several more sets of bars with associated selector magnets can be mounted just below the first set.

*Shuttle selecting and operating mechanism*

The preferred embodiment of the invention has provision for operating any one of a number of shuttles at a time. In the arrangement disclosed there are seven shuttles, any one of which can be selectively operated, and it will be obvious that a greater or lesser number of shuttles could be employed. With each of the shuttles having a different colored thread therein, the fabric woven can have more colors to produce a design with more detail.

In accordance with the invention the shuttles are arranged in shuttle boxes, one on each side of the loom. These shuttle boxes are indicated generally by reference numeral 181 and have a separate compartment therein for each shuttle, that is, each shuttle box 181 has seven compartments such as 182. The shuttle boxes 181 are open on their ends facing the warp threads of the loom so that the shuttles indicated generally by reference numeral 183 can enter and leave the same. Only one shuttle is operated at a time and the shuttle after leaving one box may remain in the other until selected for operation again, and during this time various ones of the other shuttles may be selected and operated. Thus any number of passages of the shuttles, either an even number or an odd number, may occur. To bring a shuttle into operative relation or to position it opposite the shed in the warp threads, the shuttle boxes are elevated. Both shuttle boxes 181 are elevated together equal distances and the amount that the shuttle boxes are elevated determines which one of the shuttles contained therein is activated. Normally the uppermost shuttle 183 in the shuttle boxes is in alignment with the shed formed by the warp threads.

The shuttle boxes 181 (best shown in Fig. 14) have arranged on opposite sides thereof a series of vertical guide rails 184 adapted to slide in stationary vertical guide channels 186 of the loom frame structure. Ball bearing rollers may be incorporated in the guiding units to permit easy movement of the shuttle boxes.

Each of the shuttle boxes 181 has associated therewith the right hand end (as shown in Fig. 16) of a lever 187. The lever 187 is pivoted at its left hand end on a pivot 188 and has secured to the central portion thereof a spring 189 normally tending to elevate the same. The lever 187 also has intermediate the two ends thereof a roller 191 adapted to co-operate with a cam 192 fixed to and rotating with a shaft 193 suitably journaled in the loom framework.

The cam 192 makes one revolution in conjunction with each cycle of operation of the loom, its operation being in timed relation with other functions, and during such operation of the cam the spring 189 would elevate the lever 187 if not otherwise restricted, and it in turn would elevate the shuttle box 181 to its highest position. This would place the lowermost shuttle 183 in the shuttle box opposite the shed formed by the warp threads 194. However, it is desirable at times to stop the shuttle box before it has reached its uppermost position and this is accomplished by energizing any one of the series of seven shuttle selecting magnets 196. The shuttle selecting magnets, any one of which is energized at a time in a manner hereinafter pointed out, have associated latches 197. When a shuttle selecting magnet is energized, the upper end of its associated latch is pivoted into the path of a stop 198 on the side of the shuttle box. Accordingly when the shuttle box is elevated so that a latch engages the stop 198, further movement of the shuttle box in an upward direction is stopped and by energizing any one of the seven shuttle selecting magnets 196, the shuttle box can be stopped in any one of seven positions. It will be understood that a corresponding shuttle selecting magnet of the other shuttle box is simultaneously energized so that both shuttle boxes are elevated the same amount.

With the shuttle boxes 181 in a stopped or selected position, the shuttle opposite the shed is activated to traverse the shed to enter its respective compartment in the opposite shuttle box and in so doing trail a thread from the bobbin contained in the shuttle through the shed. Following the traversing of the shed by a shuttle, the cams 192 pivot the levers 187 in a clockwise direction to restore the shuttle boxes to their lowermost normal positions. The two shuttle boxes move together and they may be operated from a single cam such as 192 through appropriate link members, or each may have a separate cam associated therewith.

The individual shuttles 183 are caused to traverse a shed by power supplied from individual electric motors contained therein. The motor 201 of the shuttle 183, shown in Figs. 17 and 18, has on the shaft thereof a worm 202 which engages and drives a gear 203. The gear 203 is mounted on a shaft 204 which also has fixed thereto another gear 206. The gear 206 meshes with and drives the gear 207 on a shaft 208 which has adjacent the upper and lower ends thereof drive wheels 209 which extend through suitable openings in the side of the shuttle and engage the interior vertical surfaces or walls of the shuttle compartment 182. The shaft 208 also has fixed thereto a beveled gear 211 which meshes with and drives a second beveled gear 212 on a horizontal shaft 213. The other end of the shaft 213 has a beveled gear similar to the gear 212 which through an associated gear drives the shaft 214 which has thereon drive wheels 216 also engaging the inner surface of the shuttle compartment. Thus on one side of the shuttle there are four drive wheels and on the opposite side thereof are an equal number of idler wheels 217 pivotally mounted on the levers 218. Springs 220 attached to the levers 218 urge the idler wheels 217 into engagement with a side of the shuttle compartment 182.

When it is desired to operate one of the shuttles after it is positioned opposite the shed, a circuit is completed to its motor 201 whereby the drive wheels 209 and 216 are caused to rotate and move the shuttle out of its compartment. The motor 201 is of the type which comes up to speed extremely rapidly and the shuttle 183 will have acquired sufficient momentum before leaving the shuttle compartment to project the same quickly across the shed and into its companion compartment in the other shuttle box. During this operation the thread from the bobbin 218' carried in the shuttle is trailed through the shed. The motor 201 is rotated in one direction for movement of the shuttle toward the right, as shown in Fig. 13, and in the opposite direction for movement of the shuttle to the left. The reverse rotation of the motor 201 is accomplished by reversal of the power and ground connections thereto in one shuttle box relative to those in the other.

The shuttle (best shown in Fig. 18) has insulatively supported on opposite sides thereof conducting segments such as 219 which extend substantially the full length of the shuttle and from which leads 221 extend to the motor 201. The segments 219 are in alignment with springs such as 222 insulatively supported on the inside walls of each shuttle compartment 182. One of the springs 222 of each pair is grounded by connecting to the ground side of a potential source while the opposite spring is connected to potential at the time it is desired to activate the shuttle. The ungrounded spring 222 is connected by a conductor 223 to a segment 224 in one of the guide rails 184 of its shuttle box. The segment 224 is insulatively supported in the guide rail 184 and when a shuttle is positioned opposite the shed of the warp threads, its segment 224 will be opposite an insulatively supported spring 226 in the fixed guide channel 186. Potential is applied through a conductor 227 to the spring 226 at the desired time so that the motor 201 in the shuttle compartment opposite the shed is caused to rotate. Thus only the shuttle opposite the shed has power applied to its motor and only one of the shuttles can operate at a time.

Control circuits

The electrical control circuits of the combined units comprising the invention are shown primarily in Fig. 1. The timing of these various electrical circuits is controlled by the distributor 21 in a manner which will now be described. The distributor comprises four stationary circular rings A, B, C and D, shown diagrammatically in the drawings which are traversed by brushes 231 and 232 on the brush arm 22. The brush arm 22 is frictionally driven from a synchronous motor and may be stopped in its normal inoperative position by a latch 233. The latch 233 is operated by a start magnet 234 which has a switch 236 in the circuit thereof as well as other switches 237 and 237a. The distributor rings, brush arm, latch, etc., may be of the type disclosed in Fig. 2 of the patent to Biele No. 2,089,532, issued August 10, 1937. The switch 236 is adjacent the distributor while the switch 237 and other similar switches 237a are adjacent the loom or looms controlled by the sensing unit. Thus the distributor can be stopped by opening one of the switches 237 remotely from the distributor.

The attendant after first placing the control tape 27 in the sensing unit 26 next closes the switch 236 whereby the magnet 234 is energized and the brush arm is released. Shortly after the release of the brush arm 22, the brush 231 will bridge the ring A with segment 238 of ring B and establish a circuit from positive potential connected to ring A through the brush to segment 238 and thence over conductor 239 and through the coils of the solenoids 89 to ground. The solenoids are thus energized and the fingers 93 of the sensing unit depressed to sense the section of the tape in operative relation therewith and apply ground to certain of the individual conductors of cable 63, these conductors being the ones which are connected to the contacts 73 beneath a perforation in the tape 27 whereby the grounded fingers are permitted to engage the same. Certain of the conductors of cable 63 extend to magnets such as 166 of the hook control unit 23, the other sides of which are connected to potential, and accordingly certain of these magnets are selectively operated by the application of ground to the circuits thereof.

As indicated in Fig. 16, certain of the contacting elements 73 are connected through coils of relays such as 241 and 241a to potential whereby the engagement of one of the fingers 93 with an associated contacting element 73 establishes a circuit for the operation of such a relay. When a relay such as 241, of which there is one for each shuttle selecting magnet 196, operates, it locks up to ground through its left hand tongue and will thus remain operated even though the finger 93 moves out of engagement with the associated contacting elements 73. At this time selected ones of the hook control magnets 166 will be operated and a selected one of the shuttle control magnets 196 will be energized, the circuit to the latter being completed by the operation of its associated relay 241 by a circuit through the right hand tongue of said relay.

In timed relation to the operation of the fingers of the sensing unit, the brush 232 establishes a circuit from negative potential at ring C to the segment 242 of ring D and over conductor 243 and through a switch 60 to the clutch control magnet 59 of the loom. This circuit, which may be in multiple to similar clutch control magnets of other looms, initiates the loom into operation and causes the grid bars to be elevated whereby they engage the upper ends of the hooks associated with operated ones of the hook selecting magnets 166. Thus the selection is locked in the hook control unit and subsequently the brush 231 passes out of operative relation with the segment 238 whereby the circuits to the solenoids 89 are interrupted and the fingers withdrawn from perforations in the tape 27. Shortly thereafter the brush 231 contacts segment 244 of ring B to establish a circuit to the feed trip magnet 37 whereby the sensed pattern area of the tape is moved out of operative relation with the sensing pins and the succeeding pattern area advanced into the sensing unit.

The loom or looms controlled by the sensing units are preferably operated by synchronous motors and when once started will remain in step with the distributor 21 since the speeds thereof are the same, and for each revolution of the brush arm 22 the loom is operated through one complete cycle of operation. In timed relation with the operation of the grid bars, the cam 192 initiates the elevation of the shuttle boxes 181 which will be stopped in a position corresponding to the operated one of the shuttle selecting magnets 196, as hereinbefore pointed out.

As indicated in Fig. 15, two of the sensing fingers 93 control the operation of relays 246 and 246a. Normally either one or the other of these two relays is operated during each cycle of the sensing unit. With relay 246, for example, operated, its right hand tongue completes a circuit from the spring 226, conductor 227, the right hand tongue and front contacts of relay 246 to conductor 247 leading to segment 248 of ring D of the distributor. The right hand tongue of relay 246a is connected to conductor 227a leading to spring 226a in the guide channel of the other shuttle box which is on the opposite side from the spring 226 in the guide channel of the first shuttle box. By the time the brush 232 contacts segment 248, the shuttle boxes will be elevated and the brush 232 thereby supplies potential from ring C over conductor 247 to one of the springs 226 or 226a, depending upon which one of the relays 246 or 246a is operated. The application of this potential operates the motor in the shuttle and causes it to traverse the shed in the warp threads. The relays 246 and 246a lock up when operated through their left hand tongues, and following the operation of the shuttle the brush 232 contacts segment 249 to apply negative potential to conductor 251. This conductor is connected, as indicated in Figs. 15 and 16, to the lower terminals of relays such as 246 and 246a, and the application of negative potential thereto causes the operated ones of these relays to release. Thus the control circuits are restored and subsequently the brush arm 22 starts another revolution and the operation of the various units is repeated in conjunction with the sensing of another pattern area of the tape.

Instead of locking a selection in the hook control unit by the elevation of the grid bars, a hook selection may be stored on relays, as indicated in Fig. 19. Here each of the hook selecting magnets 166 extends to the right hand tongue of an associated relay 252, the front contact of which is connected by conductor 247 to segment 248. The relays 252 are selectively operated by circuits through respective fingers 93 and contacts 73 during a sensing operation and lock up through their left hand tongues by a circuit from positive potential through their windings. Following the operation of the relays 252 potential is applied through conductor 247 to operate the hook control magnets 166 associated with selectively operated ones of the relays 252. The locked up ones of the relays 252 are released following the elevation of the hooks by the application of negative potential to the lower terminals of relays 252 whereby the relays are released.

It will be obvious that various modifications of the invention other than those shown and described herein may be made without departing from the spirit or essential attributes thereof, and it is desired therefore that only such limitations be placed thereon as are specifically set forth in the appended claims.

What is claimed is::

1. In combination, a selectively perforated tape, sensing means for sequentially sensing consecutive areas of said tape, electrical circuits controlled by said sensing means, a loom having a plurality of warp threads, a plurality of back-and-forth movable shuttles, means controlled by said electrical circuits to form sheds in saidt warp threads and select one of said shuttles in accordance with the perforations in consecutive areas of said tape means to position the selected shuttle opposite said shed, an electric motor in each of said shuttles, and means also controlled by said sensing means to apply electrical potential to the motor of the selected shuttle in either one of two directions.

2. In combination with a loom having a plurality of warp threads, means for forming sheds in said warp threads, a plurality of shuttles for traversing said sheds, an electric motor in each of said shuttles, shuttle driving means operated by said motors and means for selectively supplying an electric current to any one of said motors at a time to cause travel of the associated shuttle through said warp sheds.

3. In combination with a weaving loom, a perforated tape with consecutive sections thereof representing consecutive pick operations of said loom and perforations of each section determining the positioning of the warp threads during a pick operation, a plurality of hooks for operating said warp threads, power operated means for operating said hooks, electrically controlled means for selectively coupling said hooks with said operating means, means for controlling said last mentioned means by said tape and means for moving a following section of said tape into sensing position while the previously selected hooks are coupled with said operating means.

4. In combination with a weaving loom, a perforated tape with consecutive sections thereof representing consecutive pick operations of said loom, electrical means for sensing a section of said tape at a time, means for forming a shed in the warp threads of said loom in accordance with the perforations, and means for moving a following section of said tape into sensing position while operating said loom in accordance with the preceding section.

5. In combination with a weaving loom, a perforated tape with consecutive sections thereof representing consecutive pick operations of said loom, means for sensing one section of said tape at a time and establishing electrical circuits in accordance with the perforations in said tape, selecting means operated by said electrical circuits, means for storing the selective operation of said selecting means and operating said loom in accordance therewith and means for moving the following section of said tape into sensing position during such operation of said loom.

6. In a weaving loom, a plurality of hooks for elevating the warp threads of said loom, operating bars for engaging and elevating said hooks, said hooks normally being out of operative alignment with said bars, an individual fixedly positioned electric magnet for each of said hooks, said magnets each having an armature operated thereby means for selectively energizing said magnets in combinations and means directly coupling said armatures to said hooks for movement in two directions therewith and controlled by operation of said magnets for selectively moving said associated hooks into operative alignment with said bars to be elevated thereby.

7. In a weaving loom, a plurality of hooks for elevating the warp threads of said loom, operating bars for engaging and elevating said hooks, said hooks normally being out of operative alignment with said bars, an individual fixedly positioned electric magnet for each of said hooks, said magnets each having an armature operated thereby, means for selectively energizing said magnets in combinations, means directly coupling said armatures to said hooks for movement in two directions therewith and controlled by operation of said magnets for selectively moving said associated hooks into operative alignment with said bars to be elevated thereby and means for preventing disengagement of said selectively operated hooks from said bars on deenergization of said magnets.

8. In combination with a loom having means for forming warp threads into sheds, a plurality of back-and-forth movable shuttles for traversing said sheds, each of said shuttles including an electric motor, means for supplying an electric current in one direction to any selected one of said motors to cause a shed traversing operation of the associated shuttle in one direction, and means for supplying an electric current in the opposite direction to any selected one of said motors to cause a shed traversing operation of the associated shuttle in an opposite direction.

9. In combination with a loom having means for forming warp threads into sheds, a plurality of back-and-forth movable shuttles for traversing said sheds, a reversable rotation electric motor contained in each of said shuttles, means for selectively supplying electric currents to any one of said motors at a time during part of each back-and-forth movement and means including the reversing of the electrical connections to said motors for operating said shuttles in opposite directions.

10. In combination with a loom having means for forming warp threads into sheds, a plurality of shuttles for traversing said sheds, means for selectively positioning any one of said shuttles at a time opposite a shed, electro-magnet means for controlling said shuttle positioning means, an electric motor contained in each of said shuttles for operating the same and means for completing an electrical circuit to only one shuttle motor at a time concomitantly with the positioning of the shuttle opposite a shed.

References Cited in the file of this patent

UNITED STATES PATENTS

| | | |
|---|---|---|
| 565,447 | Gates | Aug. 11, 1896 |
| 572,245 | Claviez | Dec. 1, 1896 |
| 1,904,006 | Means | Apr. 18, 1933 |
| 2,055,031 | Hutchings | Sept. 22, 1936 |
| 2,058,101 | Perry | Oct. 20, 1936 |
| 2,075,139 | Scheller | Mar. 30, 1937 |
| 2,106,504 | Lindquist | Jan. 25, 1938 |
| 2,136,064 | Tandler et al. | Nov. 8, 1938 |
| 2,146,611 | Young | Feb. 7, 1939 |
| 2,354,843 | Tandler et al. | Aug. 1, 1944 |
| 2,377,800 | Mascarenhas | June 5, 1945 |
| 2,438,098 | Tandler et al. | Mar. 16, 1948 |
| 2,454,146 | Ezbelent | Nov. 16, 1948 |

FOREIGN PATENTS

| | | |
|---|---|---|
| 194,318 | Germany | Jan. 15, 1907 |